United States Patent
Wangchen

(10) Patent No.: US 7,518,856 B2
(45) Date of Patent: Apr. 14, 2009

(54) ELECTRONIC APPARATUS AND COMPONENT SCALE ADJUSTING DEVICE THEREOF

(75) Inventor: Sheng Wangchen, Taipei (TW)

(73) Assignee: ASUSTek Computer Inc., Taipei (TW)

(*) Notice: Subject to any disclaimer, the term of this patent is extended or adjusted under 35 U.S.C. 154(b) by 237 days.

(21) Appl. No.: 11/433,452

(22) Filed: May 15, 2006

(65) Prior Publication Data
US 2006/0274491 A1 Dec. 7, 2006

(30) Foreign Application Priority Data
Jun. 1, 2005 (TW) .............................. 94118082 A

(51) Int. Cl.
G06F 1/16 (2006.01)
A47B 81/00 (2006.01)
A47B 97/04 (2006.01)
B41J 5/00 (2006.01)

(52) U.S. Cl. ..................... 361/683; 361/680; 312/273; 248/461; 400/472

(58) Field of Classification Search .............. 360/680, 360/683; 248/461, 134; 312/223.1, 223.2, 312/273–276; 16/316, 318, 362; 400/472, 400/714; 361/680, 683
See application file for complete search history.

(56) References Cited
U.S. PATENT DOCUMENTS
6,529,370 B1* 3/2003 Kamishima .................. 361/680

* cited by examiner

Primary Examiner—Jayprakash N Gandhi
Assistant Examiner—Nidhi Desai
(74) Attorney, Agent, or Firm—Rabin & Berdo, PC

(57) ABSTRACT

An electronic apparatus comprises a base, a top cover, a scale-adjustable component, an adjusting component, and a linked component. The top cover is connected to the base and is openable and closeable with respect to the base. The scale-adjustable component is disposed on the base. The adjusting component comprises an adjusting portion connected to the top cover and a sleeve connected to the adjusting portion and disposed on the base. The linked component is received in the sleeve and connected to the scale-adjustable component, having a spiral groove, in which the protrusion mounted on the inner wall of the sleeve is positioned. When the top cover is opened, the adjusting portion is expanded to drive the sleeve to rotate. Meanwhile, the protrusion slides with respect to the spiral groove to drive the linked component to move along an axis direction of the sleeve so as to expand the scale-adjustable component.

20 Claims, 7 Drawing Sheets

ELECTRONIC APPARATUS AND COMPONENT SCALE ADJUSTING DEVICE THEREOF

This application claims the benefit of Taiwan application Serial No. 94118082, filed Jun. 1, 2005, the subject matter of which is incorporated herein by reference.

BACKGROUND OF THE INVENTION

1. Field of the Invention

The invention relates in general to an adjustable electronic apparatus, and more particularly to an electronic apparatus having internal components and the component scale adjusting device thereof.

2. Description of the Related Art

The features of portability and convenience are more and more important to consumer electronic products. In addition to the functions of electronic products, slimness and lightweight are chief considerations of consumers. Therefore, how to provide an electronic product satisfying the requirements of portability and practicality has become a focus of consideration to research and development engineers.

The notebook computer is taken for example. Currently, many manufacturers are engaged in the development and production of small-scaled screen products so as to meet consumers' requirements of slimness, lightweight, and compactness. Due to the limitation of the electronic product size, some of the keyboards must be contracted to be received in the electronic product. The contracted keyboard causes inconvenience to the user. The concept of interval-adjustable keyboard is thus provided to resolve the above problem of inconvenience. According to the traditional interval-adjustable keyboard, the intervals between keys are re-arranged, and the keyboard is received in the body of the electronic product by means of alternating arrangement. As for the methods lack of linked mechanism, the keyboard is expanded or folded up manually, not only causing inconvenience to the user but also easily resulting in damage due to incorrect operation

SUMMARY OF THE INVENTION

It is therefore an object of the invention to provide an electronic apparatus and the component scale adjusting device thereof. When a top cover is opened or closed with respect to a base, the scale of the internal components of the electronic apparatus is adjusted. The electronic apparatus can be expanded for use and can be contracted into a smaller size for storage. Thus, the scale of the electronic apparatus is contracted and the convenience of operation is enhanced.

The embodiment of the invention achieves the above-identified object by providing an electronic apparatus comprising a base, a top cover, a scale-adjustable component, an adjusting component, and a linked component. The top cover is connected to the base and is openable and closeable with respect to the base. The scale-adjustable component is disposed on the base. The adjusting component further comprises an adjusting portion and a sleeve. The adjusting portion is connected to the top cover, and the sleeve is connected to the adjusting portion and disposed on the base. The sleeve has a protrusion mounted on an inner wall thereof. The linked component is received in the sleeve and connected to the scale-adjustable component. The linked component has the spiral groove, in which the protrusion is positioned. When the top cover is opened, the adjusting portion is expanded to drive the sleeve to rotate. Meanwhile, the protrusion slides with respect to the spiral groove to drive the linked component to move along an axis direction of the sleeve so as to expand the scale-adjustable component.

The embodiment of the invention achieves the above-identified object by providing another notebook computer comprising a base, a screen, an interval-adjustable keyboard, an adjusting component and a linked component. The screen is connected to the base and is openable and closeable with respect to the base. The interval-adjustable keyboard is disposed on the base. The adjusting component further comprises an adjusting portion and a sleeve. The adjusting portion is connected to the screen, and the sleeve is connected to the adjusting portion and disposed on the base. The sleeve has a protrusion mounted on the inner wall thereof. The linked component is received in the sleeve and connected to the interval-adjustable keyboard. The linked component has a spiral groove, in which the protrusion is positioned. When screen is opened, the adjusting portion is expanded to drive the sleeve to rotate. Meanwhile, the protrusion slides with respect to the spiral groove to drive the linked component to move along an axis direction of the sleeve so as to expand the interval-adjustable keyboard.

The embodiment of the invention achieves the above-identified object by providing yet another component scale adjusting device applied in an electronic apparatus. The component scale adjusting device comprises a base, a top cover and a scale-adjustable component. The top cover is connected to the base and is openable and closeable with respect to the base, and the scale-adjustable component is disposed on the base. The component scale adjusting device comprises an adjusting component and a linked component. The adjusting component further comprises an adjusting portion and a sleeve. The adjusting portion is connected to the top cover, and the sleeve is connected to the adjusting portion and disposed on the base. Meanwhile, the sleeve has a protrusion mounted on an inner wall thereof. The linked component is received in the sleeve and connected to the scale-adjustable component. The linked component further has a spiral groove, in which the protrusion is positioned. The adjusting portion is expanded to drive the sleeve to rotate when the top cover is opened. Meanwhile, the protrusion slides with respect to the spiral groove to drive the linked component to move along an axis direction of the sleeve so as to expand the scale-adjustable component.

Other objects, features, and advantages of the invention will become apparent from the following detailed description of the preferred but non-limiting embodiments. The following description is made with reference to the accompanying drawings.

DETAILED DESCRIPTION OF THE INVENTION

The electronic apparatus and the component scale adjusting device thereof according to the invention are exemplified below by a notebook computer having an interval-adjustable keyboard.

Figure 1A:
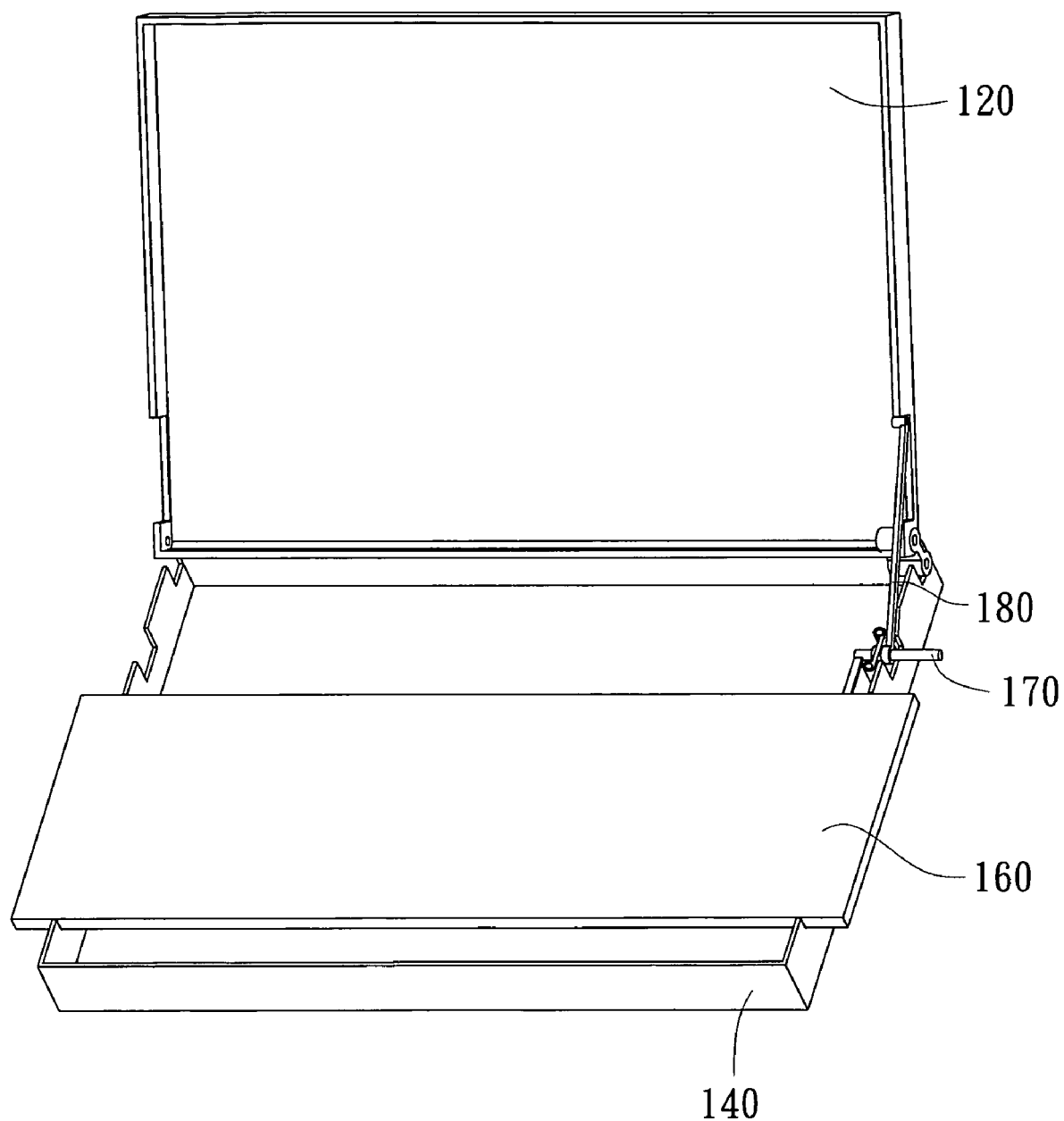
FIG. 1A is a three-dimensional structural diagram showing a notebook computer according to a preferred embodiment of the invention is in use.

Referring to FIG. 1A, a three-dimensional structural diagram showing a notebook computer according to a preferred embodiment of the invention is in use is shown. The notebook computer 100 comprises a screen 120, a base 140, a keyboard 160, a linked component 170 and an adjusting component 180. The screen 120 is connected to the base 140 and can be opened from and closed to the base 140. The keyboard 160 is a scale-adjustable component disposed on the base 140. One end of the adjusting component 180 is connected to a lateral side of the screen 120, and another end of the adjusting component 180 is disposed on a lateral side of the base 140. The linked component 170 is for connecting the adjusting component 180 and the keyboard 160. The linked component 170 and the adjusting component 180 are preferably made of hard materials, so that the transmission efficiency of applied force can be enhanced and that the lifespan of product can be prolonged.

Figure 1B:
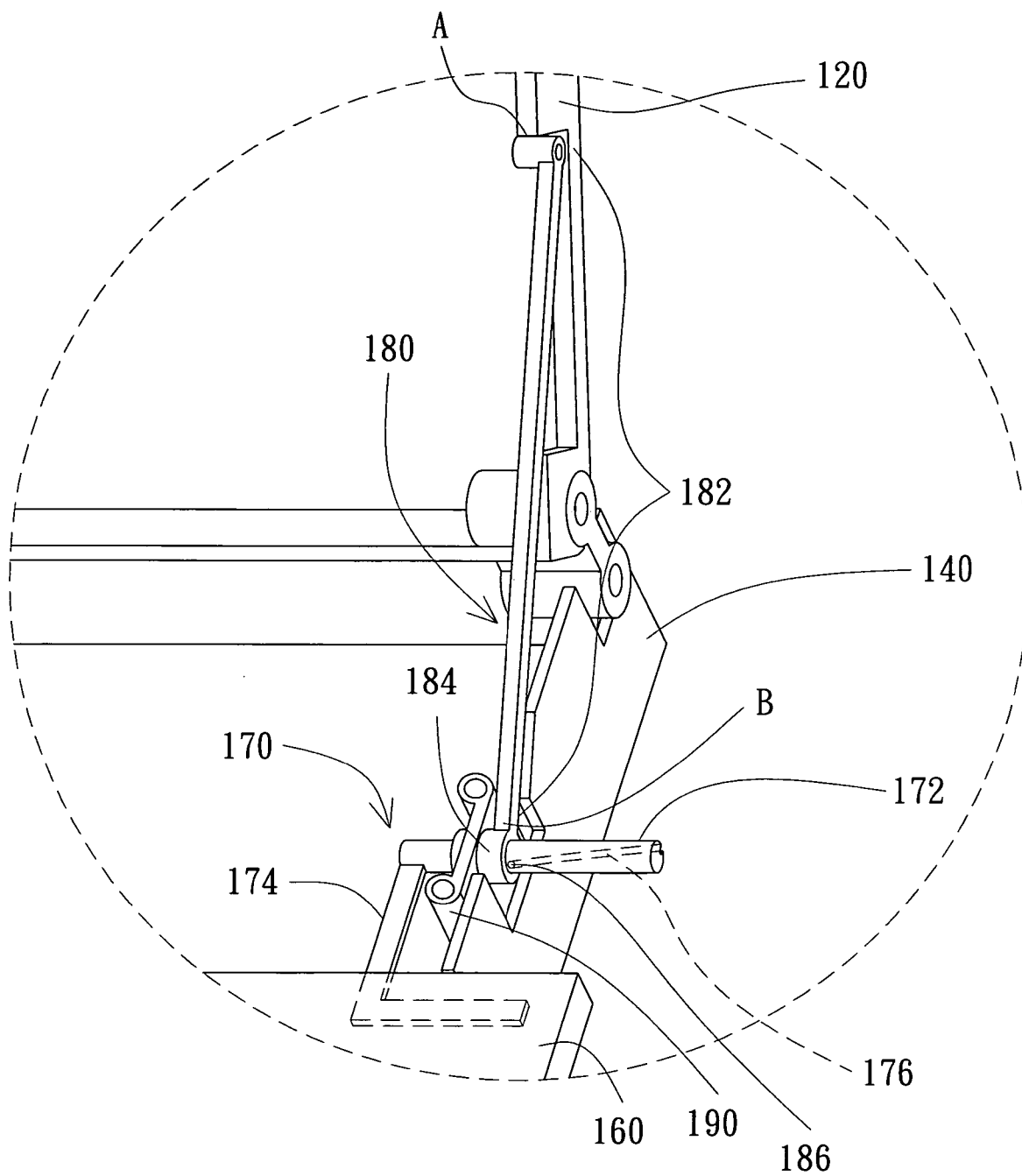
FIG. 1B is a partial detailed structural diagram of a notebook computer in FIG. 1A.
Figure 1C:
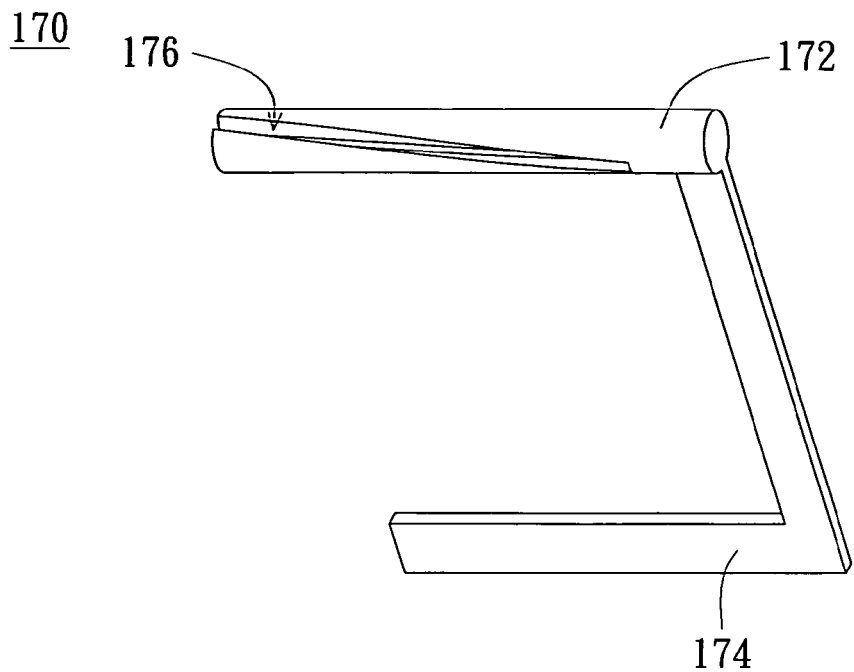
FIG. 1C is a detailed structural diagram of a linked component in FIG. 1A.
Figure 1D:
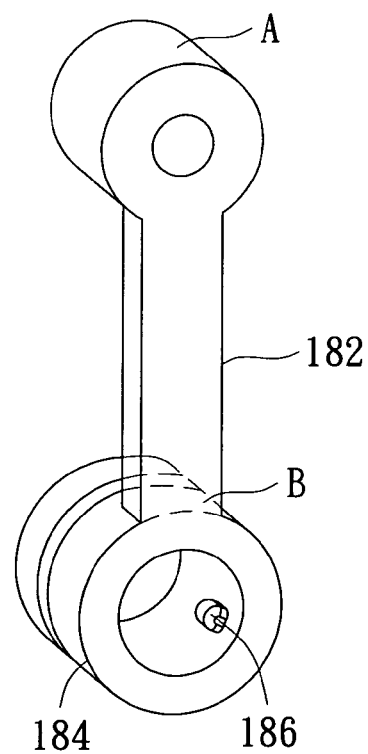
FIG. 1D is a detailed structural diagram of an adjusting component in FIG. 1A.

Referring to FIG. 1B, FIG. 1C and FIG. 1D, FIG. 1B is a partial detailed structural diagram of a notebook computer 100 in FIG. 1A; FIG. 1C is a detailed structural diagram of a linked component 170 in FIG. 1A; and FIG. 1D is a detailed structural diagram of adjusting component 180 in FIG. 1A. The linked component 170 comprises a linked shaft 172 and an active shaft 174. The adjusting component 180 comprises an adjusting portion 182 and a sleeve 184. One end A of the adjusting portion 182 is connected to a lateral side of the screen 120, and the sleeve 184 is connected to another end B of the adjusting portion 182 and disposed on a lateral side of the base 140. The adjusting portion 182, such as an adjustable sleeve shaft or an adjustable retainer shaft for instance, is denoted by a shaft only without illustrating the adjusting mechanism. The linked shaft 172 is received in the sleeve 184, and the active shaft 174 is preferably L-shaped for connecting the linked shaft 172 and keyboard 160. A spiral groove 176 is disposed on the linked shaft 172, and a protrusion 186 is mounted on the inner wall of the sleeve 184. The protrusion 186, positioned in the spiral groove 176, drives the sleeve 184 to rotate when the adjusting portion 182 of the adjusting component 180 is expanded or contracted. The protrusion 186, mounted on the inner wall of the sleeve 184, is driven to slide within the spiral groove 176 and pushes the linked component 170 to move along an axis direction of the sleeve so as to expand or contract the keyboard 160. Furthermore, the notebook computer 100 further comprises a fixing portion 190 fixed on a lateral side of the base 140, and the sleeve 184 is rotatably disposed between the fixing portion 190 and the base 140.

Figure 2A:
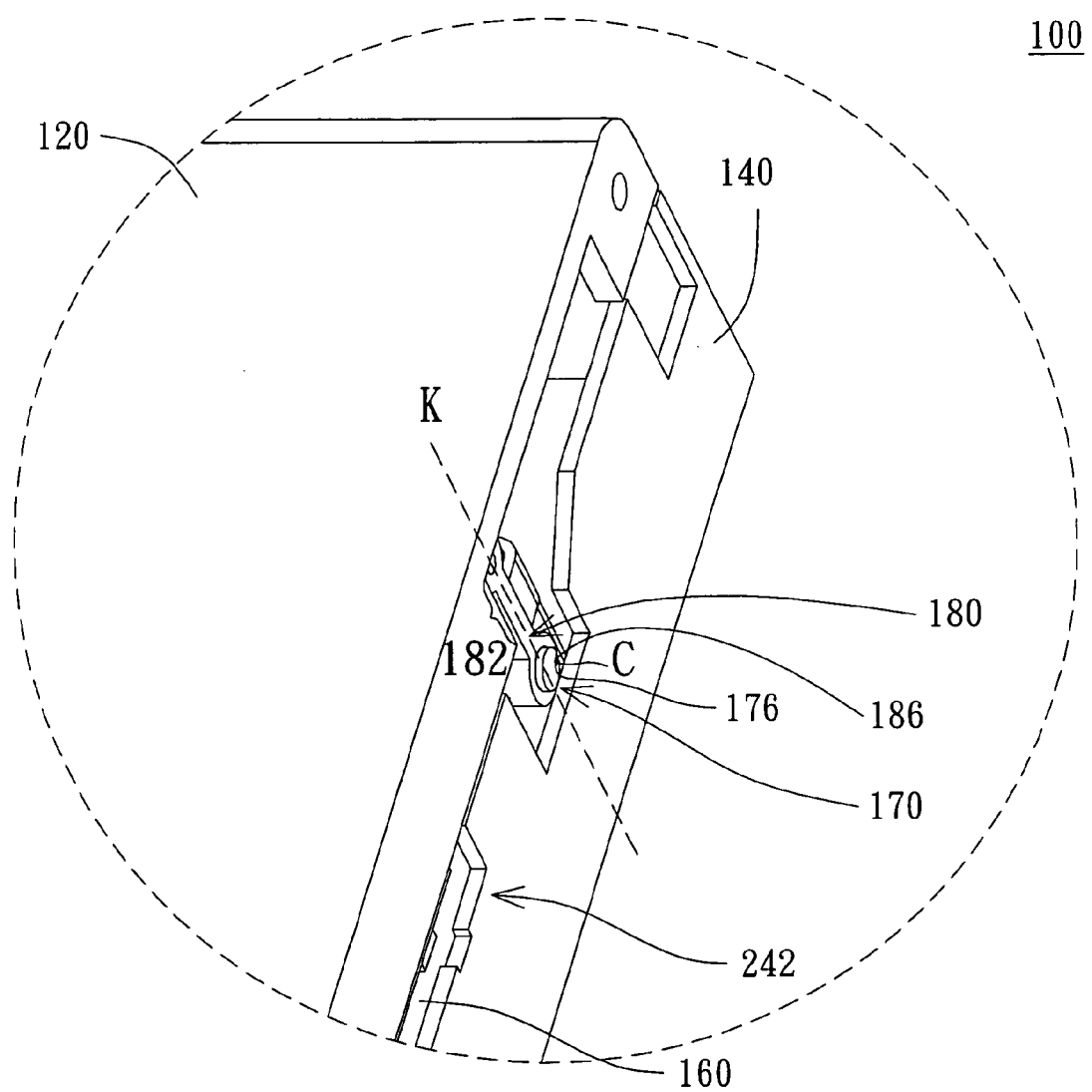
FIG. 2A is a partial three-dimensional structural diagram showing a notebook computer in FIG. 1A is not in use.

Referring to FIG. 2A, a partial three-dimensional structural diagram showing a notebook computer 100 in FIG. 1A is not in use. The base 140 further has a lateral opening 242 enabling the interval-adjustable keyboard 160 to be expanded. When the screen 120 is closed to the base 140, the interval-adjustable keyboard 160 is received in an inner side of a lateral opening 242 of the base 140, and the adjusting component 180 is received between the screen 120 and the lateral side of the base 140. Meanwhile, the adjusting component 180 is aligned with a vertical line K perpendicular to the base 140, and the protrusion 186 is positioned at an outer terminal end C of the spiral groove 176.

Figure 2B:
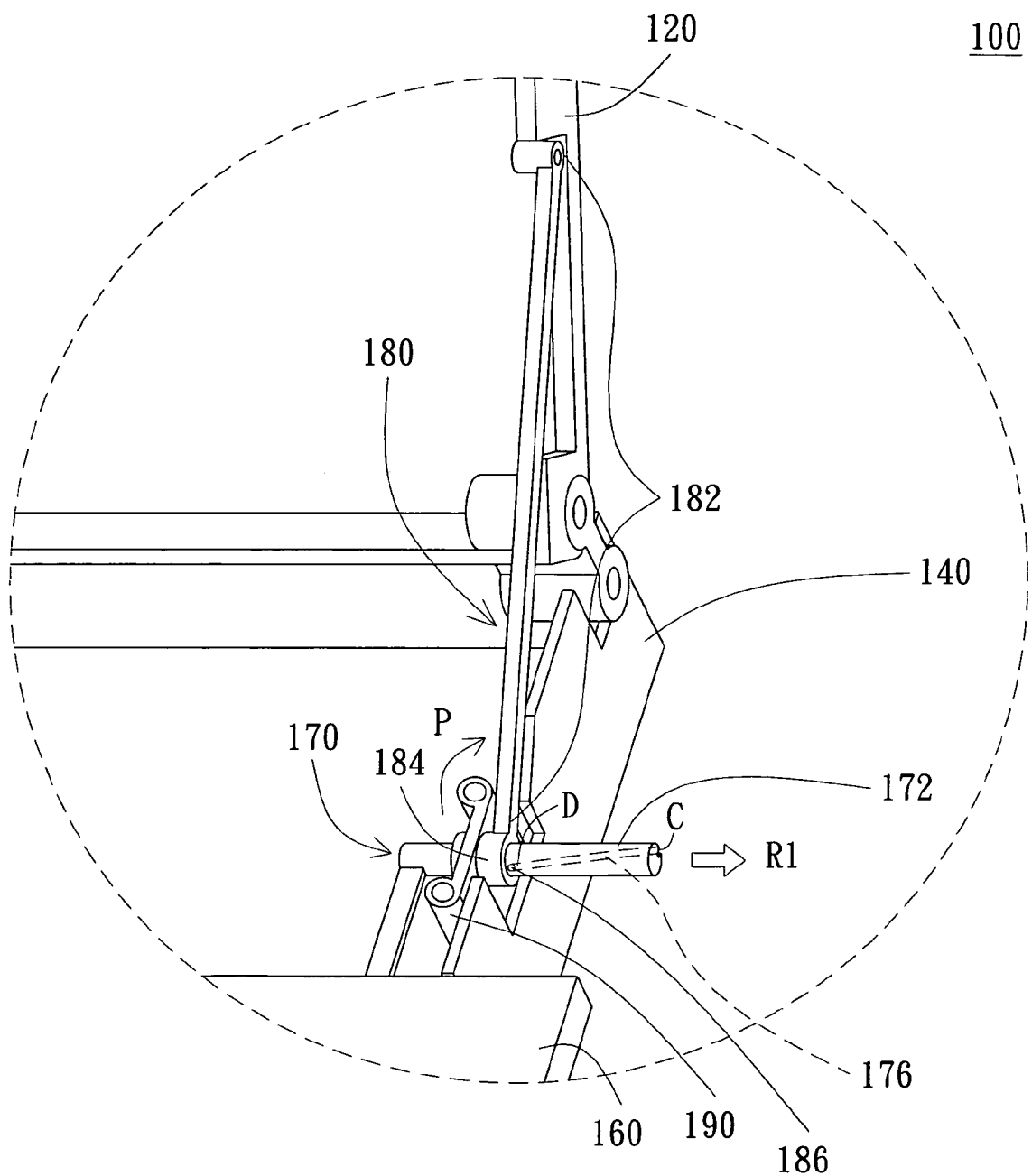
FIG. 2B is a partial three-dimensional structural diagram showing a notebook computer in FIG. 1A is in use.
Figure 2C:
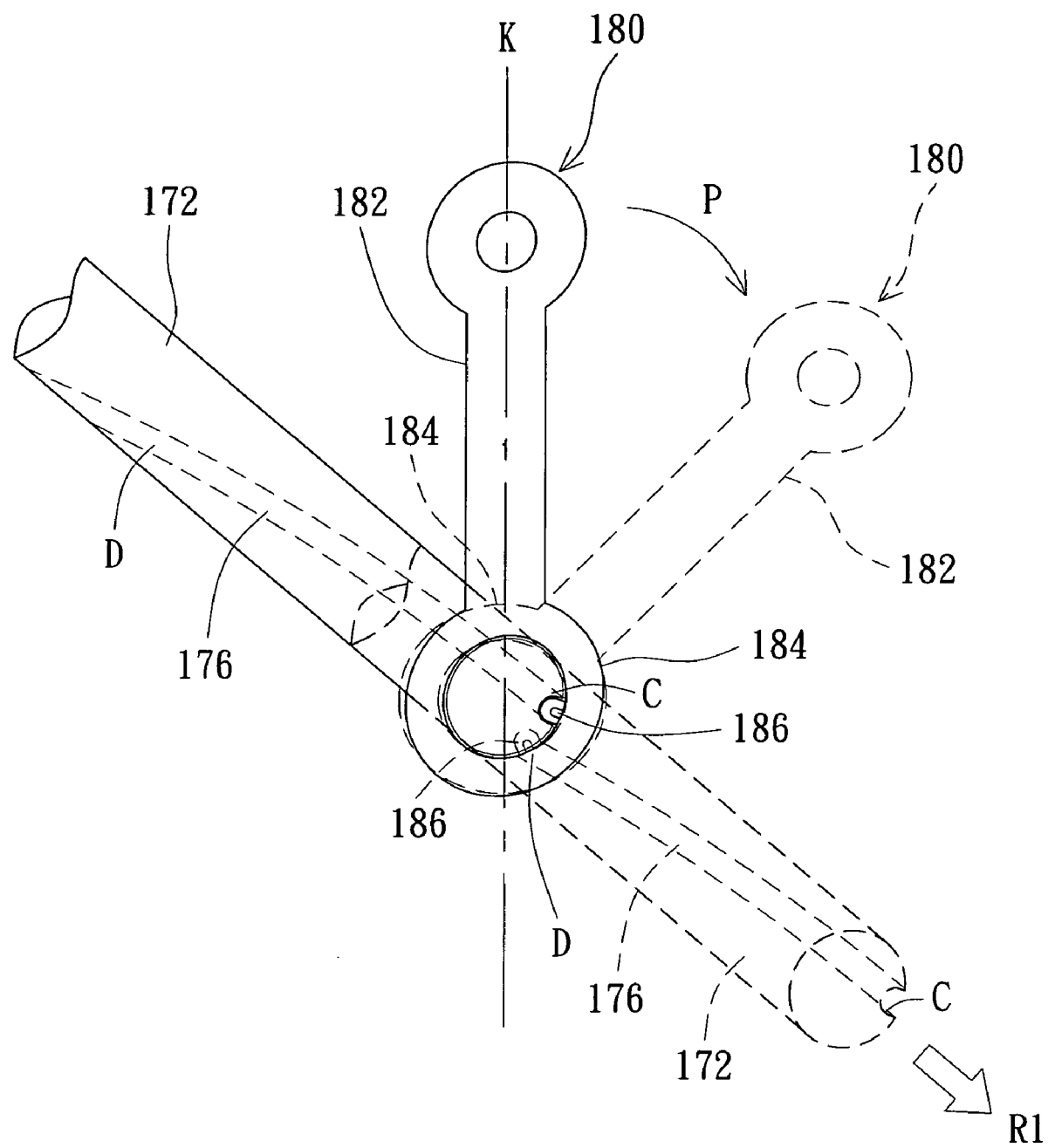
FIG. 2C is a diagram showing the linkage movement between a linked component and an adjusting component of a notebook computer in FIG. 1A.

Referring to FIG. 2B, a partial three-dimensional structural diagram showing a notebook computer in FIG. 1A is in use is shown. When the screen 120 of the notebook computer 100 is opened, the adjusting portion 182 connected to a lateral side of the screen 120 is expanded and rotated around the linked shaft 172 along an arrow direction P (clockwise direction when viewed from the right hand side of the notebook computer 100), to drive the protrusion 186 of the sleeve 184 to rotate along the arrow direction P. As shown in FIG 2A, when the screen 120 is closed, the adjusting portion 182 is contracted in length (i.e., the adjusting portion 182 is shorter); and as shown in FIG. 2B, when the screen 120 is opened, the adjusting portion 182 is expanded in length (i.e. the adjusting portion is longer). Referring to FIG. 2C at the same time, a diagram showing the linkage movement between a linked component 170 and an adjusting component 180 of a notebook computer 100 in FIG. 1A is shown. As shown in FIG. 2C, the solid lines illustrate the relative position between the adjusting component 180 and the linked shaft 172 when the notebook computer 100 is not in use. Meanwhile, the adjusting portion 182 is aligned with a vertical line K, and the protrusion 186 is positioned at an outer terminal end C of the spiral groove 176. When the screen 120 is opened, the adjusting portion 182 of the adjusting component 180 is driven to rotate along the arrow direction P to drive the protrusion 186 to rotate. Thus the protrusion 186 pushes the linked shaft 172 to move with respect to the sleeve 184 along an axis direction R1 of the sleeve until the protrusion 186 stays at an inner end D of the spiral groove 176, enabling the notebook computer 100 to be in use. The dotted lines in FIG. 2C illustrate the relative position between the adjusting component 180 and the linked shaft 172 when the notebook computer 100 is in use.

Figure 2D:
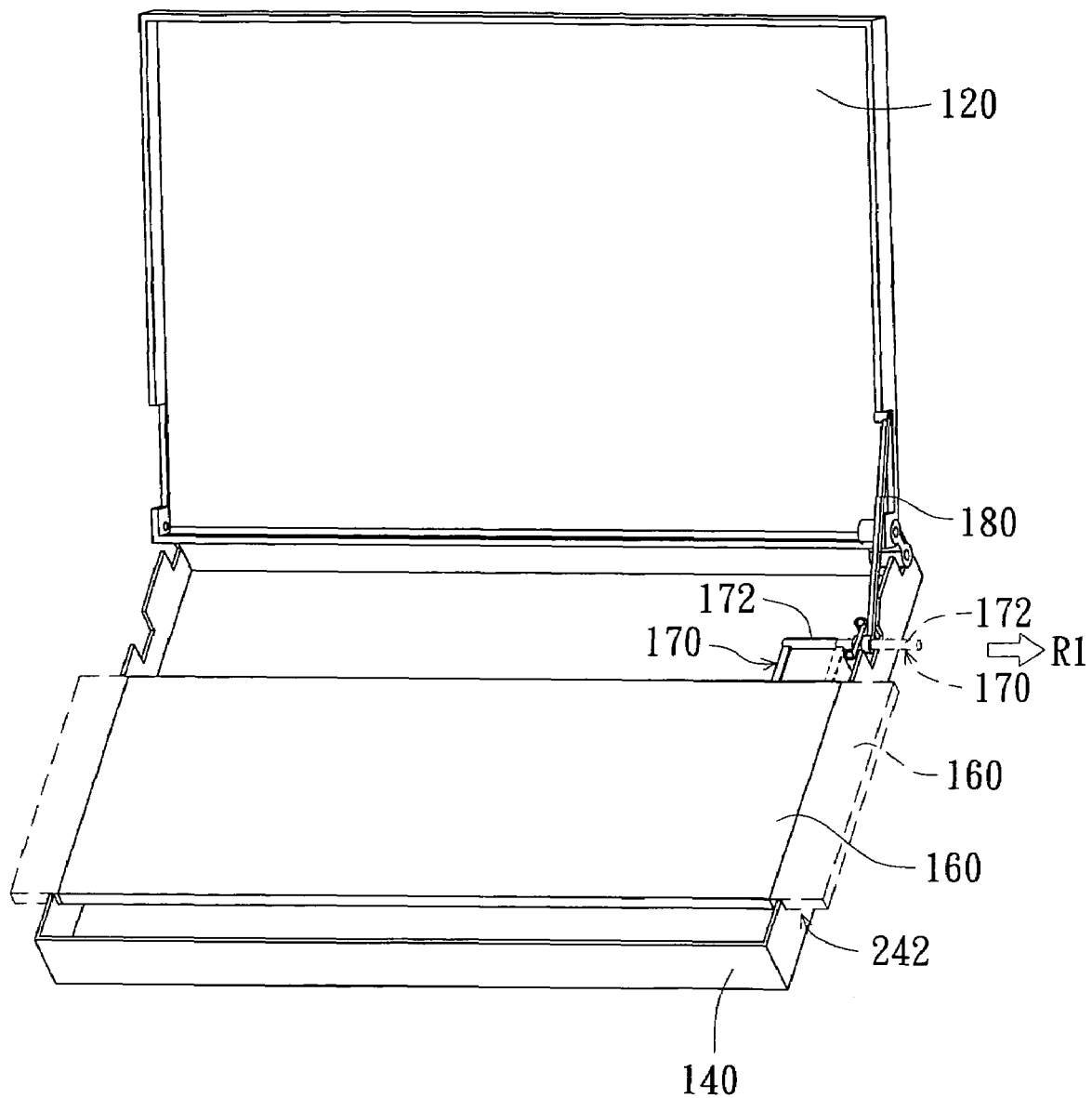
FIG. 2D is a diagram showing the linkage movement between a linked component and a keyboard of a notebook computer in FIG. 1A.

Referring to FIG. 2D, FIG. 2D is a diagram showing the linkage movement between a linked component and a keyboard of a notebook computer in FIG. 1A is shown. When the linked shaft 172 is moved along the axis direction R1 of the sleeve, the keyboard 160 linked up with the linked shaft 172 is brought to be expanded outside a lateral opening 242 for key intervals on the keyboard to be enlarged. Meanwhile, the state and positions of the keyboard 160 and the linked component 170 and the linked shaft 172 thereof are illustrated in dotted lines. Likewise, when the user has finished using the notebook computer, the linked shaft 172 is moved towards the opposite direction of the axis direction R1 of the sleeve, so that the keyboard 160 connected to the active shaft 174 is received in the base 140 and resumes the not-in-use state of FIG. 2A. Meanwhile, the state and positions of the keyboard 160 and the linked component 170 and the linked shaft 172 thereof are illustrated in solid lines. Therefore, when the screen 120 is opened from or closed to the base 140, the keyboard 160 is expanded to have a normal key interval for the user's convenience of operation when the notebook computer 100 is in use, and the keyboard 160 is received in the base 140 to reduce the size of the notebook computer 100 when the notebook computer 100 is not in use. The keyboard of the invention can be any keyboard which can be expanded or contracted to adjust the key interval.

According to the above embodiment, despite the invention is exemplified by connecting the adjusting component 180 to a lateral side of the screen 120 and a lateral side of the base 140, the two ends of the adjusting component 180 of the notebook computer 100 of the invention can respectively be connected to other positions of the screen 120 and the base 140. Despite the invention is exemplified by the linked component 170 comprising a linked shaft 172 and an active shaft 174, the invention can adopt a linked component of other structures. Any linked components capable of rotating and driving the keyboard to be expanded by an adjusting component when the screen is opened and capable of storing the keyboard in the base to reduce the size of the notebook computer when the screen is closed are still within the scope of technology of the invention.

Despite the invention is exemplified by the notebook computer 100 having a screen 120 and a keyboard 160, the invention is also applicable to other electronic apparatuses having a top cover and a scale-adjustable component. Any component scale adjusting devices having a linked component and an adjusting component, capable of expanding the scale-adjustable component for user's convenience when the top cover is opened, and capable of storing the scale-adjustable component to reduce the size of the electronic apparatus when the top cover is closed are still within the scope of technology of the invention.

The electronic apparatus and the component scale adjusting device thereof disclosed in above embodiment of the invention avail the opening and closing of the top cover and are advantaged by adjusting the scale of a component according to the adjusting component and the linked component only without using any extra driving devices. Since the adjusting component and the linked component can be disposed on a lateral side of the electronic apparatus, the invention, apart from saving energy consumption, adjusts the scale of electronic apparatus in a simple but effective manner subject to the restriction of limited internal space. Thus, the scale of the electronic apparatus can be contracted and the convenience of operation can be enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic apparatus, comprising:
   a base;
   a top cover, which is connected to the base and is openable and closeable with respect to the base;
   a scale-adjustable component disposed on the base;
   an adjusting component, comprising:
      an adjusting portion connected to the top cover;
      a sleeve connected to the adjusting portion and disposed on the base, wherein the sleeve has a protrusion mounted on an inner wall thereof; and
   a linked component received in the sleeve and connected to the scale-adjustable component, wherein the linked component has a spiral groove, in which the protrusion is positioned;
   wherein when the top cover is opened or closed, the adjusting portion is expanded or contracted in length to drive the sleeve to rotate, so that the protrusion slides within the spiral groove and pushes the linked component to move along an axis direction of the sleeve so as to expand or contract the scale-adjustable component.

2. The electronic apparatus according to claim 1, wherein the adjusting portion is connected to a lateral side of the top cover, and the sleeve is disposed on a lateral side of the base corresponding to the lateral side of the top cover, and wherein the sleeve is spaced apart from a hinge via which the top cover is openable and closeable with respect to the base.

3. The electronic apparatus according to claim 1, wherein the linked component further comprises:
   a linked shaft for being received in the sleeve; and
   an active shaft for connecting the linked shaft and the scale-adjustable component.

4. The electronic apparatus according to claim 1, further comprising a fixing portion fixed on the base, wherein the sleeve is rotatably disposed between the fixing portion and the base.

5. The electronic apparatus according to claim 1, wherein the adjusting portion is an adjustable sleeve shaft or an adjustable retainer shaft.

6. The electronic apparatus according to claim 1 being a notebook computer.

7. The electronic apparatus according to claim 6, wherein the scale-adjustable component is an interval-adjustable keyboard.

8. The electronic apparatus according to claim 6, wherein the top cover is a screen.

9. A notebook computer, comprising:
   a base;
   a screen, which is connected to the base and is openable and closeable with respect to the base;
   an interval-adjustable keyboard disposed on the base;
   an adjusting component, comprising:
      an adjusting portion connected to the screen; and
      a sleeve connected to the adjusting portion and disposed on the base, wherein the sleeve has a protrusion mounted on an inner wall thereof; and
   a linked component received in the sleeve and connected to the interval-adjustable keyboard, wherein the linked component has a spiral groove, in which the protrusion is positioned;
   wherein when the screen is opened or closed, the adjusting portion is expanded or contracted in length to drive the sleeve to rotate, so that the protrusion slides within the spiral groove and pushes the linked component to move along an axis direction of the sleeve so as to expand or contract the interval-adjustable keyboard.

10. The notebook computer according to claim 9, wherein the adjusting portion is connected to a lateral side of the screen, and the sleeve is disposed on a lateral side of the base corresponding to the lateral side of the screen, and wherein the sleeve is spaced apart from a hinge via which the screen is openable and closeable with respect to the base.

11. The notebook computer according to claim 9, wherein the linked component further comprises:
    a linked shaft for being received in the sleeve; and
    an active shaft for connecting the linked shaft and the interval-adjustable keyboard.

12. The notebook computer according to claim 9, further comprising a fixing portion fixed on the base, wherein the sleeve is rotatably disposed between the fixing portion and the base.

13. The notebook computer according to claim 9, wherein the adjusting portion is an adjustable sleeve shaft or an adjustable retainer shaft.

14. A component scale adjusting device applied in an electronic apparatus, wherein the electronic apparatus comprises a base, a top cover and a scale-adjustable component, the top cover is connected to the base and is openable and closeable with respect to the base, the scale-adjustable component is disposed on the base, and the component scale adjusting device comprises:
    an adjusting component, comprising:
       an adjusting portion connected to the top cover; and
       a sleeve connected to the adjusting portion and disposed on the base, wherein the sleeve has a protrusion mounted on the inner wall thereof; and a linked component received in the sleeve and connected to the scale-adjustable component, wherein the linked component has a spiral groove, in which the protrusion is positioned;

wherein when the top cover is opened or closed, the adjusting portion is expanded or contracted in length to drive the sleeve to rotate, so that the protrusion slides within the spiral groove and pushes the linked component to move along an axis direction of the sleeve so as to expand or contract the scale-adjustable component.

15. The component scale adjusting device according to claim 14, wherein the linked component further comprises:
a linked shaft for being received in the sleeve; and
an active shaft for connecting the linked shaft and the scale-adjustable component.

16. The component scale adjusting device according to claim 14, wherein the adjusting portion is an adjustable sleeve shaft or an adjustable retainer shaft.

17. The component scale adjusting device according to claim 14, wherein the scale-adjustable component is an interval-adjustable keyboard.

18. The component scale adjusting device according to claim 14, wherein the electronic apparatus further comprises a fixing portion fixed on the base, and the sleeve is rotatably disposed between the fixing portion and the base.

19. The electronic apparatus according to claim 2, wherein when the top cover is closed with respective to the base, the adjusting component is substantially perpendicular to the lateral side of the base.

20. The notebook computer according to claim 10, wherein when the screen is closed with respective to the base, the adjusting component is substantially perpendicular to the lateral side of the base.

* * * * *